United States Patent [19]

Junker

[11] 3,867,793

[45] Feb. 25, 1975

[54] RELIEF GRINDING ATTACHMENT FOR SCREW TAP GRINDING MACHINES AND POLYGON GRINDING

[76] Inventor: Erwin Junker, Talstrasse 78, Nordrach/Baden, Germany

[22] Filed: Nov. 8, 1973

[21] Appl. No.: 413,881

Related U.S. Application Data

[63] Continuation of Ser. No. 336,698, Feb. 28, 1973, abandoned.

[52] U.S. Cl.................. 51/97 R, 51/234, 51/241 R
[51] Int. Cl............................................. B24b 3/22
[58] Field of Search.......... 51/94 R, 94 C, 96, 97 R, 51/97 NC, 101 R, 105 R, 105 EC, 234, 241 R; 74/117

[56] References Cited
UNITED STATES PATENTS
3,310,989   3/1967   Ward .................................... 74/117
3,403,479   10/1968  De Almeida Ferreirinha... 51/105 R FOREIGN PATENTS OR APPLICATIONS
641,591    9/1950   Great Britain ..................... 51/94 C
2,352,288  12/1909  Germany ............................ 51/234

Primary Examiner—Al Lawrence Smith
Assistant Examiner—Nicholas P. Godici
Attorney, Agent, or Firm—Burns, Doane, Swecker & Mathis

[57] ABSTRACT

A relief grinding machine suitable for performing relief grinding and polygon grinding operations comprises a grinding wheel, a spindle shaft for carrying a work piece, a disc rotably mounted about a central axis and carrying the spindle shaft eccentrically relative to the central axis, a main shaft concentrically arranged around the disc, a lever arm rigidly coupled to the main shaft, and a lead cam arrangement. The lead cam arrangement is operable to impart rotation to the lever arm, the main shaft and the disc as a unit to alter the position of the spindle shaft relative to the grinding wheel. The main shaft is connected to the disc by means of an adjustable connection such that the relative angular position between the disc and the main shaft may be adjusted, thereby altering the amount of horizontal movement of the spindle shaft per a given amount of rotation of the lever arm. A driving mechanism is provided to rotate the spindle shaft relative to the disc independently of adjustment of the spindle shaft about the central axis.

9 Claims, 2 Drawing Figures

RELIEF GRINDING ATTACHMENT FOR SCREW TAP GRINDING MACHINES AND POLYGON GRINDING

RELATED APPLICATION

This is a continuation of copending U.S. application Ser. No. 336,698, filed Feb. 28, 1973, and now abandoned.

BACKGROUND AND OBJECTS OF THE INVENTION

The present invention concerns an attachment for the relief grinding and polygon grinding for screw tap grinding machines or the like. Such machines typically comprise a spindle shaft displaceable towards the grinding wheel and away therefrom, the shaft supporting a clamping chuck for the screw tap, with a lead cam system being provided for controlling this movement of the spindle shaft.

By means of a conventionally employed arrangement of a sliding and setting change gear between the lead cam and spindle shaft, it is possible to drive the guide or lead cams at a number of rotations corresponding to the number of posts of the screw tap, while the spindle shaft is executing one rotation. In this manner, for each post the spindle shaft executes a relative movement towards the grinding wheel corresponding to the amount of relief grinding.

Screw tap grinding machines are already known; the guide cam system usually acts as a cam disc directly on the spindle shaft which is mounted, for instance, in a slide. In order to vary the length of the relief grinding movement, i.e., the stroke of the spindle shaft, the guide cam must be replaced. Considerable resting or shut-down times are therefore necessary for converting the machine and, in addition, a very large supply of guide cam arrangements, e.g., cam discs, must be kept in stock for each height of stroke. Furthermore, the known arrangement is very susceptible to processing tolerances in the guiding of the lead spindle slide and the transmission of force for the lifting movement or stroke, so that very slight wear may lead to inaccuracy in the machining and frequent overhauling of the machine is necessary.

An attachment for the relief grinding of screw taps is also known, for example, in which the relief grinding movement of a grinding wheel relative to the workpiece is effected by a cam control with one roller lever. Alternately, two roller levers may be used with oppositely disposed, interconnected tapping rollers running on control cams of constant diameter and engaging from opposite sides on the guide cam arrangement.

In this known arrangement the inertia forces acting on the eccentric in the transmission of the adjusting movement from the guide cams are very great. In addition, a lever system is necessary for transmitting the adjusting movement, which involves considerable play and consequently considerable inaccuracy in the transmission. An adjustment of the stroke of the eccentric is possible only by a change in the lever system. Thus, the entire arrangement becomes relatively slow and prevents a rapid operating sequence having great accuracy.

It is a general object of the invention to obviate or minimize problems of the sort previously discussed.

It is a primary object of the invention to provide a novel mechanism for adjusting a spindle shaft of a screw tap grinding machine relative to a grinding wheel thereof.

It is another object of the present invention to provide a relief grinding attachment for such a screw tap grinding machine which enables the fixed stroke for the relief grinding movement to be changed with a predetermined range without replacing the lead cam, said attachment being much less sensitive to machining or wear tolerances and also having the necessary slight inertia movement for high relief grinding speeds.

It is still a further object of the invention to provide such an attachment which enables a workpiece spindle shaft to be driven by a drive connection in all adjusted positions thereof.

SUMMARY OF A PREFERRED EMBODIMENT OF THE INVENTION

At least some of these objects are achieved in accordance with the present invention in a relief grinding attachment of the above-mentioned type in that a lead cam engages a lever system on which a spindle shaft is mounted eccentrically relative to the center of rotation of the lever system.

In this relief grinding attachment of the present invention, the lead cams therefore transmit to the lever system an angular motion which remains constant over the entire relief grinding range. A change in the set motion or adjustment stroke of the spindle shaft can be very simply influenced by a change in the lever ratio between a lever serving as driving lever and an eccentric arm serving as driven lever. This is accomplished by altering the relative angular position between the centre of rotation of the lever system and the axis of rotation of the spindle shaft. This ensures that bearings which have been once run-in are always stressed with a constant angular motion with any selected relief grinding amounts and, hence, inaccuracies due to wear do not substantially influence the ground image itself.

This is particularly the case when, according to a preferred embodiment of the invention, the spindle shaft is mounted in a rotatable eccentric disc (i.e., part of the driving lever) mounted at its circumference on the machine frame and the free end of which operably engages a lead cam arrangement.

In order to achieve an infinitely variable adjustment in a very simple manner by changing the lever arm ratio, the spindle shaft is preferably journalled in a second disc which is rotatable independently of the eccentric disc around the centre axis of said eccentric disc. The adjustable rotary drive for altering the lever ratio is preferably a worm drive which comprises a worm shaft mounted on a portion of the driving lever at right angles to the longitudinal axis thereof and engaging a worm gear wheel secured to the second disc concentrically to the axis of roration thereof. Due to this arrangement an infinitely variable adjustment of the angular position of the axis of the spindle shaft relative to the longitudinal axis of the eccentric disc drive is possible in a very simple and reliable manner with very accurate observation of measurements. At the same time, the adjustable rotary drive may be designed for an adjustment of the position of the eccentric disc, with the spindle shaft being positioned as an extension of the lever system and being displaceable through 90° to one side.

Due to this arrangement, an adjustment of the relief grinding stroke of the spindle shaft between zero and the highest value provided by the lead cam is possible and sufficient. The following roller journalled on the lever is preferably guided between two lead cams running in the same direction, in that the lead cams have a proportional drop and a proportional rise directly ahead of the upper dead centre.

The drive of the spindle shaft journalled eccentrically to the centre of rotation of the lever is preferably effected by way of an epicyclic gear in which a spur gear wheel mounted concentrically to the centre of rotation of the lever system engages the inner teeth of a planet wheel located on the spindle shaft concentrically to the axis of rotation thereof. This arrangement makes the drive independent of the angular position of the spindle shaft relative to the lever system.

In order, particularly in the case of small grinding wheel diameters, to compensate the displacement of the centre of the axis between the workpiece and grinding wheel resulting from the rotation of the workpiece spindle on the eccentric disc, a device may be provided for controlling the adjustment of the grinding wheel support dependently on the change of the relative position between the spindle shaft axis and the longitudinal axis of the lever occurring with the actuation of the adjusting rotary drive.

THE DRAWING

The present invention will be described in greater detail hereinafter with reference to an embodiment illustrated in the accompanying drawings, in which:

FIG. 1 shows a schematic side elevation of a screw tap grinding machine comprising a relief grinding attachment according to the present invention with the spindle shaft driving mechanism removed for clarity; and FIG. 2 shows schematically a longitudinal section through the spindle shaft and through the drive thereof.

DETAILED DESCRIPTION OF A PREFERRED EMBODIMENT

Figure 1:
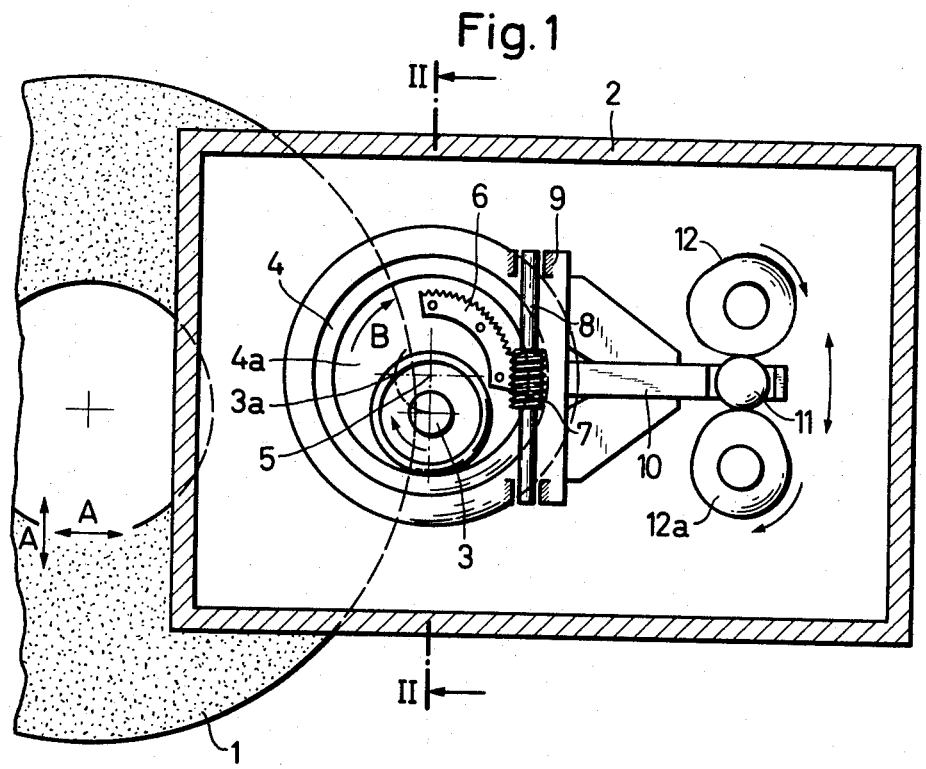

FIG. 1 shows a grinding wheel 1 mounted in a grinding wheel support (not shown) adjustable in two directions, in the direction of the arrows A and A'.

Provided oppositely to the grinding wheel support, in a housing 2, is a spindle shaft having a clamping device (not shown) for carrying the workpiece, i.e., the screw tap. The spindle shaft 3 is journalled eccentrically on a disc 4a which in turn is journalled to rotate within and relative to a main shaft 4.

The main shaft 4 acts as an eccentric disc in that a rotation of the main shaft effects a circular motion of the spindle shaft 3 about the axis of rotation 5 of the main shaft.

Rigidly connected to the disc 4a is a worm gear segment 6 located concentrically to the axis of rotation 5 of the main shaft. A worm 7 engages in the worm gear 6 and is mounted by way of a shaft 8 in a bearing block 9 of a lever arm 10. The lever 10 is connected to the main shaft 4 and carries at its free end a following roller. This following roller 11 runs on lead cams 12 and 12a. When the lead cams 12 and 12a rotate, the lever 10, firmly connected to the main shaft 4, executes, with the following roller 11, an initial downward movement. In this manner, the disc 4a is turned in the direction of the arrow B by means of the rotary drive 6 and 7, and the workpiece spindle shaft 3 is thereby moved towards the grinding wheel. With a constant stroke of the lever 10, dependently on the lead cams 12 and 12a, the resulting amount of motion or stroke of the spindle shaft 3 towards the grinding wheel 1 depends on the angular position of the spindle shaft 3 relative to the axis of rotation 5 of the main shaft. In the indicated position of the spindle shaft 3, shown in FIG. 1 at a right angle relative to the longitudinal axis of the lever 10, the amount of this stroke is at its maximum. When the spindle shaft 3 is at the point 3a, as an extension of the longitudinal axis of the lever 10, the amount of this stroke is zero. The pivotal motion between the illustrated porition of the spindle shaft 3 and the point 3a may be infinitely variably adjusted by turning the worm 7.

In other words, as the worm gear-established location of the shaft 3 relative to axis 5 approaches the position 3a, the cam-induced horizontal adjustment of the shaft per degree of lever rotation decreases. That is, the greatest amount of horizontal distance change of shaft 3 per degree of lever rotation occurs within the initial 45° zone (i.e., from the position shown toward the position 3a).

In order to compensate for the angular displacement of the spindle shaft 3 which changes the height of the spindle shaft 3 relatively to the grinding wheel, a control device (not shown) may be provided. Such a control device would be arranged to automatically guide the grinding wheel support in a vertical direction and, if desired, also in a horizontal direction according to the change of position of the spindle shaft 3 effected by the rotation of the main shaft around the axis of rotation 5, so that the grinding wheel and the workpiece are always kept in a predetermined relative position assisting the grinding process.

Figure 2:
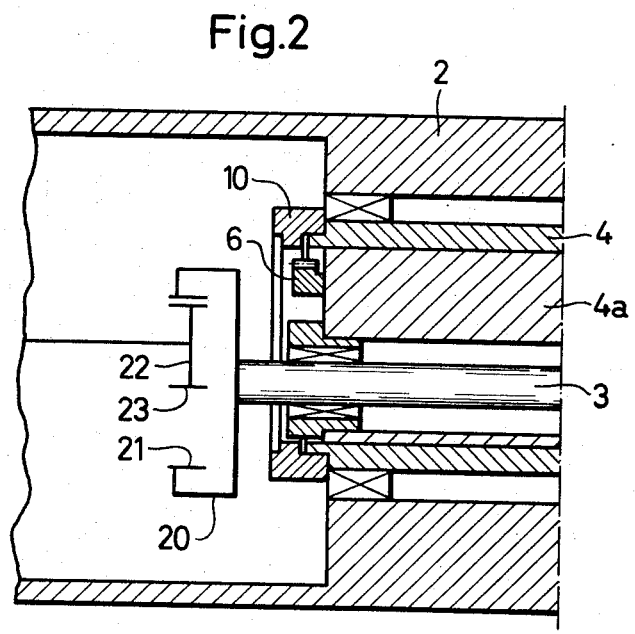

As shown in FIG. 2, the drive of the workpiece spindle shaft 3 may be effected by way of an epicyclic gear arrangement. Such an arrangement includes a spur gear 20 acting as a planet wheel. This gear 20 has inner teeth 21 and is located on the spindle shaft 3, coaxially thereto. A driving gear 22 engages, with its outer teeth 23, the inner teeth 21. This driving wheel 22 is journalled co-axially to the axis of rotation 5 of the main shaft 4 in the machine housing. Due to this arrangement, the teeth 21 and 23 of the gears 20 and 22 remain in engagement independently of the angular position of the spindle shaft 3 about the axis of rotation 5 of the main shaft 4. In other words, the gears 20 and 22 remain in mesh in all positions of the spindle shaft 3.

MAJOR ADVANTAGES AND SCOPE OF THE INVENTION

By means of the present invention the position of the spindle shaft relative to the grinding wheel may be altered with the occurrence of minimal inertia forces acting on the adjusting discs. Moreover, the novel adjusting lever system involves minimal play and is less sensitive to machining or wear tolerances.

The provision of relatively adjustable portions of the lever system, i.e., the discs 4 and 4a in the preferred embodiment, enables the amount of adjustment stroke to be varied without replacing the lead cam arrangement or the lever system.

The drive mechanism for the spindle shaft enables the spindle shaft to be driven in whatever position of adjustment the shaft may be in.

Although the invention has been described in connection with a preferred embodiment thereof, it will be appreciated by those skilled in the art that additions,

What is claimed is:

1. A relief grinding machine suitable for performing relief grinding and polygon grinding operations comprising:
grinding wheel means;
spindle shaft means displaceable toward and away from said grinding wheel means and adapted to carry a clamping chuck for holding a workpiece;
control lever means comprising:
  means rotatable about a central axis, and
  lever arm means rigidly connected to said rotatable means;
means mounting said spindle shaft means relative to said control lever means such that the longitudinal axis of said spindle shaft means is disposed eccentrically relative to said central axis;
means for transmitting rotary motion between said control lever means and said spindle shaft mounting means such that rotation of said control lever means produces movement of said spindle shaft axis relative to said grinding wheel means; and
a plurality of lead cams engaging the free end of said lever arm means such that movement of the cams produces rotation of said control lever means to move said spindle shaft axis relative to said grinding wheel means;
said spindle shaft mounting means being selectively shiftable relative to said control lever means for changing the location of the longitudinal axis of said spindle shaft means relative to said central axis independently of rotation of said lever arm means so as to concurrently change the position of said spindle shaft means relative to said grinding wheel means for a given orientation of said lever arm means.

2. The apparatus of claim 1 wherein said rotatable means comprises a main shaft; said mounting means comprises a disc rotatably mounted relative to said main shaft; said spindle shaft means being rotatable about its said own longitudinal axis relative to said disc.

3. The apparatus according to claim 2 wherein said disc and said main shaft are concentrically arranged; said transmitting means comprising rotary adjusting means operably connected between said disc and said control lever means to selectively set the angular position of said spindle shaft relative to said central axis.

4. The apparatus according to claim 1 wherein said lever arm means includes a follower roller journalled thereon and operably disposed between said lead cams.

5. The apparatus according to claim 1 wherein said spindle shaft means is journalled for rotation on said control lever means; drive means being provided to rotate said spindle shaft means relative to said lever means comprising a spur gear journalled for rotation coaxially relative to said control central axis of said lever means; and a planet gear mounted on said spindle shaft means for rotation with said spindle shaft means co-axially with the longitudinal axis thereof; outer teeth of said spur gear being in meshing engaged with inner teeth of said planet gear.

6. The apparatus according to claim 3 wherein said spindle shaft means is journalled for rotation on said lever means; drive means being provided to rotate said spindle shaft means relative to said lever means comprising a spur gear journalled for rotation co-axially relative to said central axis of said lever means; and a planet gear mounted on said spindle shaft means for rotation with said spindle shaft means co-axially with the longitudinal axis thereof; outer teeth of said spur gear being in meshing engaged with inner teeth of said planet gear.

7. The apparatus according to claim 1 wherein said rotation transmitting mechanism comprises an adjustment mechanism connected between said control lever means and said spindle shaft mounting means that is arranged for rotating said spindle shaft relative to said lever arm means.

8. A relief grinding machine suitable for performing relief grinding and polygon grinding operations comprising:
grinding wheel means;
spindle shaft means displaceable toward and away from said grinding wheel means and adapted to carry a clamping chuck for holding a workpiece;
lever means comprising:
  means rotatable about a central axis and carrying said spindle shaft means;
  the longitudinal axis of said spindle shaft means being disposed eccentrically relative to said central axis, and
lever arm means connected to said rotatable means;
a plurality of lead cams engaging the free end of said lever arm means such that movement of the cams produces rotation of said rotatable means to adjust the position of said spindle shaft means relative to said grinding wheel means;
said rotatable means comprising a main shaft and a disc rotatably mounted relative to said main shaft; said spindle shaft means being rotatable relative to said disc;
said disc and said main shaft being concentrically arranged; rotary adjusting means operably connected between said disc and said main shaft to set the angular position of said spindle relative to said main shaft and said lever arm means; and
said rotary adjusting means comprising a worm shaft extending at a right angle relative to the longitudinal axis of said lever arm and mounted for rotation with said main shaft and said lever arm means, and a worm gear secured to said disc concentrically with the axis of rotation thereof; said worm shaft being meshingly engaged with said worm gear to transmit rotary motion between said lever arm means and said disc and to adjust the angular position of said spindle shaft relative to said lever arm means.

9. A relief grinding machine suitable for performing relief grinding and polygon grinding operations comprising:
grinding wheel means;
spindle shaft means displaceable toward and away from said grinding wheel means and adapted to carry a clamping chuck for holding a workpiece;
lever means comprising:
  means rotatable about a central axis and carrying said spindle shaft means;
  the longitudinal axis of said spindle shaft means being disposed eccentrically relative to said central axis, and lever arm means connected to said rotatable means; a plurality of lead cams engaging the free end of said lever arm means such that movement of the cams produces rotation of said rotatable means to adjust the position of said spindle shaft means relative to said grinding wheel means;

said rotatable means comprising a main shaft and a disc rotatably mounted relative to said main shaft; said spindle shaft means being rotatable relative to said disc; said disc and said main shaft being concentrically arranged; rotary adjusting means operably connected between said disc and said main shaft to set the angular position of said spindle relative to said main shaft and said lever arm means; and said rotary adjustment means being arranged to adjust the angular position of said spindle shaft relative to said lever arm means within a ninety degree range.

* * * * *